Jan. 11, 1966   F. S. SAMPSON   3,228,279
SNAP FASTENER STUD AND METHOD OF MAKING SAME
Filed Feb. 28, 1963

Inventor:
Frederick S. Sampson,
by Walter S. Jones
Atty.

United States Patent Office 3,228,279
Patented Jan. 11, 1966

3,228,279
SNAP FASTENER STUD AND METHOD
OF MAKING SAME
Frederick S. Sampson, Saugus, Mass., assignor to United-Carr Incorporated, a corporation of Delaware
Filed Feb. 28, 1963, Ser. No. 261,771
1 Claim. (Cl. 85—5)

This invention relates to a fastener part having a snap fastener stud portion and also to the method of making the stud portion.

An object of the invention is to provide a fastener member for moldings, wiring clips, etc., having an improved snap fastener stud portion of simple construction and easy to manufacture.

Another object of the invention is to provide an improved method of manufacturing a snap fastener stud by the use of a set of tools constructed for shearing the fastener leg portions and their associated support engaging portions from the base of the snap fastener stud member, forming the sheared leg portions and associated support engaging portions and then bending the leg portions at their juncture with the base portion so that they extend substantially normal to the plane of the base portion.

Fastener devices having a drawn boss divided into a series of leg portions to provide a snap fastener stud are known to be old in the art. Also old in the art are various snap fastener stud devices made by forming and folding strip portions to provide the leg portions of the stud. However, it is not known to be old to make a snap fastener stud having opposed leg portions formed entirely from the metal sheared from a base portion so that one leg is formed from the material of the other leg thereby leaving the other leg as a fork-shaped leg and forming an aperture in the base portion, as will be described now.

Figure 1:
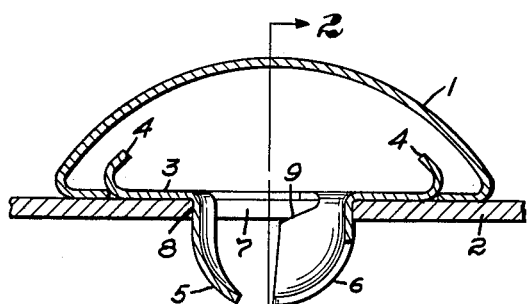
FIG. 1 is an enlarged section showing a normal trim molding installation, the parts of which are secured by the improved fastener member.
Figure 2:
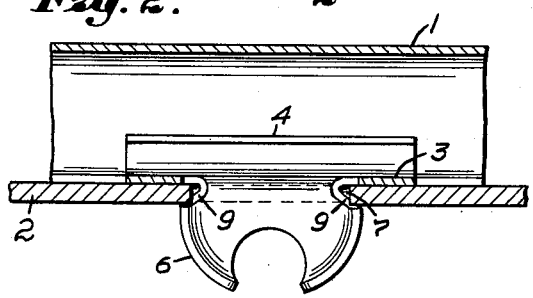
FIG. 2 is a section taken on the line 2—2 of FIG. 1.
Figure 3:
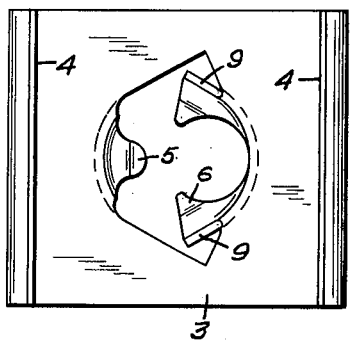
FIG. 3 is a top plan view of one form of the improved fastener member.
Figure 4:
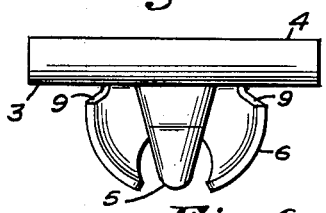
FIG. 4 is an end view of the fastener shown in FIG. 3 as viewed from the left-hand side thereof.
Figure 5:
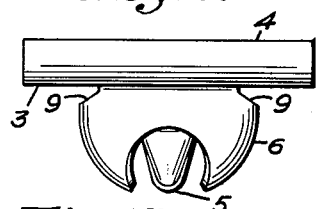
FIG. 5 is an end view of the fastener shown in FIG. 3 as viewed from the right-hand side thereof.

One form of fastener, including the improved snap fastener stud, is shown in FIG. 1 as a molding fastener for holding a hollow molding 1 in place upon a support 2 such as may be found in motor vehicle body constructions.

The improved fastener has a base portion 3, at opposite edges of which are provided flanges 4—4 shaped to engage with the molding as illustrated in FIG. 1. A pair of opposed yieldable legs 5 and 6 extend downwardly from the base portion 3 and are shaped to snap into an aperture 7 in the support 2. Leg 5 is shaped in such a manner that it provides a support engaging portion 8 adjacent where it joins the base 3, as best shown in FIG. 1. Leg 6 is shaped as a fork and has spurs 9—9 located at opposite side edges of the leg. The spurs 9—9 are spaced away from the base portion 3 to provide support engaging portions which snap under the under-surface of the support 2 to lock the fastener in engagement with the support 2. Thus, it will be understood that the stud portion is of simple construction, and the improved method of forming the fingers now will be described.

Figure 6:
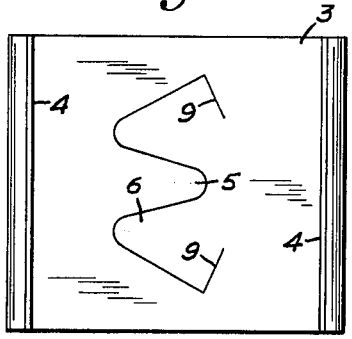
FIG. 6 is a plan view of the fastener member shown in FIGS. 3, 4, and 5 indicating the sheared outline of the legs and associated portions in the flat base portion of the fastener.
Figure 7:
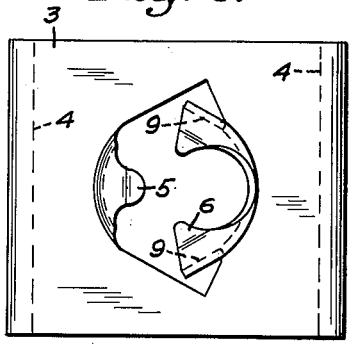
FIG. 7 is a bottom plan view of the fastener showing the form and location of the sheared leg portions upon completion of the improved method of making the same.

By providing the fastener manufacturing tools with a simple shearing punch and die, as will be understood by anyone skilled in the art, the outlines of the legs 5 and 6 and the spurs 9—9 will be formed in the base 3 of the fastener as shown in FIG. 6. It will be noted that the material for the leg 5 is taken from the material of the leg 6 thereby leaving the leg 6 as a fork-shaped construction. Thereafter suitable forming tools to curve the legs and bend the spurs 9—9 will perform on the legs and finally suitable tools will bend the legs downwardly so that they extend substantially normal to the plane of the base 3 and the fastener is completely formed as shown in FIG. 7. It will now be understood by anyone skilled in the art that the improved method of making the fastener requires the use of less expensive tools (by eliminating a series of drawing operations), and provides a strong snap fastener stud of simple construction that will be relatively easy to snap into engagement with a support and hold in relatively fixed engagement therewith.

While there has been illustrated and described one particular snap fastener construction for use in a particular installation and there has also been described an improved method of making the snap fastener stud portion of the fastener it should be understood that the inventions are best defined by the following claim.

I claim:

A fastener member including a base portion having an aperture extending therethrough and at least two support engaging leg portions extending from said base portion and joined thereto adjacent the aperture, each of said legs being curved on a plane taken at right angles to said axis to provide a concave surface facing said axis and being curved in an axial direction, one of said legs having a slot of generally circular configuration to provide a pair of arms and having a pair of planar support engaging surfaces which are inclined relative to said base to provide a space to receive a support and the other of said legs having a free terminal end.

References Cited by the Examiner
UNITED STATES PATENTS

| | | | |
|---|---|---|---|
| 1,675,788 | 7/1928 | Carr | 85—5 |
| 2,315,211 | 3/1943 | Kost | 85—5 |
| 2,438,499 | 3/1948 | Hartman | 85—5 |
| 2,531,264 | 11/1950 | Flora. | |
| 2,698,472 | 1/1955 | Knohl. | |

EDWARD C. ALLEN, Primary Examiner.